United States Patent [19]

Cooke et al.

[11] Patent Number: 5,440,453
[45] Date of Patent: Aug. 8, 1995

[54] EXTENDED ARCHITECTURE FOR FPGA

[75] Inventors: Laurance H. Cooke, San Jose; Matthew D. Penry, Modesto, both of Calif.

[73] Assignee: Crosspoint Solutions, Inc., Santa Clara, Calif.

[21] Appl. No.: 152,267

[22] Filed: Nov. 12, 1993

Related U.S. Application Data

[63] Continuation of Ser. No. 809,745, Dec. 18, 1991, abandoned.

[51] Int. Cl.⁶ .............................................. H01R 23/68
[52] U.S. Cl. ...................... 361/790; 361/744; 361/791; 361/792; 257/697; 439/69; 174/262
[58] Field of Search .............. 361/744, 748, 767, 772, 361/776, 792, 791, 790, 794, 799; 257/686, 697; 439/45, 69, 74, 75; 174/52.4, 261, 262

[56] References Cited

U.S. PATENT DOCUMENTS

| | | |
|---|---|---|
| 3,676,748 | 7/1972 | Kobayashi et al. . |
| 3,718,750 | 2/1973 | Sayers et al. . |
| 3,764,856 | 10/1973 | Martin ............................ 317/100 |
| 3,777,221 | 12/1973 | Tatusko et al. . |
| 3,999,105 | 12/1976 | Archey et al. . |
| 4,103,321 | 7/1978 | Gansert et al. . |
| 4,137,559 | 1/1979 | Reuting . |
| 4,338,652 | 7/1982 | Romanczuk et al. . |
| 4,514,784 | 4/1985 | Williams et al. . |
| 4,620,632 | 11/1986 | Alemanni . |
| 4,630,172 | 12/1986 | Stenerson et al. . |
| 4,654,694 | 3/1987 | Val . |
| 4,729,061 | 3/1988 | Brown . |
| 4,920,454 | 4/1990 | Stopper et al. . |
| 4,953,060 | 8/1990 | Lauffer et al. ..................... 361/388 |
| 5,128,831 | 7/1992 | Fox, III et al. ..................... 361/396 |

*Primary Examiner*—Leo P. Picard
*Assistant Examiner*—Young Whang
*Attorney, Agent, or Firm*—Townsend and Townsend Khourie and Crew

[57] ABSTRACT

The invention provides a packaging technique implementing an electronic circuit, comprising several individually packaged sub-circuits, on a circuit board within the footprint of a single package. The embodiment of the present invention is particularly advantageous when implementing application specific integrated circuits (ASICs) or field programmable gate arrays (FPGAs). Selected pins of an upper package are electrically coupled to corresponding pins of the next lower adjacent package such that the pins of the uppermost package can be coupled to the pins of the lowermost package and correspondingly to the signal leads and power bus conductors of the printed circuit board. Portions of selected pins may be removed from one or more packages prior to forming the stacked structure to electrically isolate corresponding pins of upper packages from the pins of lower packages. A template is provided that permits rapid identification of pins to be removed before the packages are configured in the stack.

Careful partitioning of the electrical circuit permits a limited number of standard bonding patterns to be combined in a large variety of configurations by rotating packages relative to adjacent packages in the stack. Each package is also provided with additional pins that may be used for vertical routing in a manner that couples non-adjacent packages without coupling to intervening packages. Heat sinks and heat pipes are attachable to the stack to increase thermal dissipation.

32 Claims, 5 Drawing Sheets

EXTENDED ARCHITECTURE FOR FPGA

This is a Continuation of application Ser. No. 07/809,745, filed Dec. 18, 1991, now abandoned.

BACKGROUND OF THE INVENTION

This invention relates to a packaging technique suitable for implementing an electronic circuit in more than one package. It is contemplated that during initial design, design engineers will verify the correctness of their design by implementing the electronic circuit on a semi-custom mask programmable gate array commonly referred to as application specific integrated circuits (ASICs) or field programmable gate arrays (FPGAs).

Due to increasing complexity in typical electronic circuits which require hundreds of input and output signals, such circuits are typically packaged in pin grid array (PGA) packages. Such packages may provide the hundreds of pins required for routing power and ground to the integrated circuit as well as input and output signal pins (I/O pins). For example, PGA packages are known in the art that provide about 565 power and I/O pins in area efficient packages that take up little space on a printed circuit board. This small footprint of the PGA packages permits more packages to be mounted on a printed circuit board, the length of signal lead and the capacitance associated with each lead on the printed circuit board can be minimized.

During design verification, it is highly desirable to design the printed circuit board such that the pattern of signal lines and power buss conductors on the printed circuit board conform to the final design pattern. However, it has been considered difficult, if not impossible, to implement an electronic circuit in an electrical system without one or more design iterations. As a consequence, one or more electronic circuits, which comprise the electrical system, are often implemented in ASICs or FPGAs which permit relatively easy design changes once an error has been detected. However, due to the inherent inefficiencies associated with implementing an electronic circuit in an ASIC or FPGA, multiple sub-circuits are often required to implement the electrical circuit intended for a single device package footprint. What is needed is a scheme for packaging multiple sub-circuits in individual package types while satisfying the stated constraint of not changing the footprint.

SUMMARY OF THE INVENTION

The invention relates to the implementation of an electronic circuit having many thousands of gates in a plurality of packages. With the present invention, the plurality of packages can be mounted on a circuit board using the space or footprint of a single package. This technique is particularly advantageous when the electronic circuit is implemented on application specific integrated circuits (ASICs) or field programmable gate arrays (FPGAs). Specifically, the present invention permits the implementation of such an electronic circuit having, by way of example, 30,000 gates on several ASICs or FPGAs each having, again by way of example, from 8,000 to 16,000 gates.

Using the package technique of the present invention, multiple ASICs or FPGAs chips are individually packaged and the packages are stacked one on top of the other (piggyback style) so that footprint on the printed circuit board is that of a single package. Such piggybacking of multiple packages is especially advantageous for FPGAs because the circuit designer has the flexibility to troubleshoot and modify the circuit under actual operating conditions.

It is contemplated that the circuit designer will initially specify the electrical circuit to be implemented on the FPGAs or ASICs and once designed and verified, using known simulation programs, the circuit will be partitioned at selected locations into various sub-circuits. A map may be generated specifying the allocation of the various sub-circuits among a corresponding number of chips and each chip is individually packaged. In one especially preferred embodiment, the designer may program the sub-circuits on a corresponding number of FPGA chips using a field programming module that completes selected electrical connections on the FPGA.

As a part of the partitioning process, a net list is also generated that indicates the interconnection of the sub-circuits. The net list preferably identifies package pins that are to be selectively removed to form isolated busses between two or more packages in the stack.

Once the various sub-circuits have been implemented on the FPGAs and appropriate pins removed, the designer may combine the various sub-circuits according to the partitioning map in the vertical stacked arrangement and the stacked structure may be coupled to the electronic system using the footprint of a single package.

By way of example, if an electronic circuit is partitioned into four sub-circuits, four packages each housing one of the sub-circuits are interconnected in a vertical stacked arrangement. In the preferred embodiment, the pins of an upper package are electrically coupled to corresponding pins of the next lower adjacent package. Thus, the pins of the uppermost package can be coupled to the pins of the lowermost package and correspondingly to the signal leads and power buss conductors of the printed circuit board. However, by removing a selected pin from one package, it is possible to electrically isolate corresponding pins of upper packages from the pins of lower packages. Pin removal permits internal circuit nodes in different packages to be connected without coupling the nodes to signal leads on the circuit board. In this manner, it is possible to provide the same electrical footprint or pin configuration of a custom integrated circuit with multiple FPGAs.

In one preferred embodiment, each sub-circuit is housed in a PGA package because of the high density of pins provided by this type of package. Preferably, the pins of the PGA package are symmetrical so that packages can be rotated relative to adjacent packages. In this manner, multiple standard bonding patterns can be combined in a large variety of configurations. In one preferred embodiment, two or three standard bonding patterns are provided for use by the designer to keep costs at a minimum. It is also preferable that each package have additional pins that are used solely for vertical routing and are not connected or bonded to a circuit node of the corresponding sub-circuit. In this manner, non-adjacent packages may be coupled without coupling to the intervening package or packages.

As noted above, it may be necessary to remove selected pins on one or more of the PGA packages. Accordingly, the present invention includes a novel method for identifying which package pins are to be removed, specifically, a template and marker. The template includes a plurality of perforated windows that may be removed enabling the marker to mark or otherwise identify the pin or pins to be removed. In the preferred embodiment, the number of windows correspond to the number of pins on the package.

Another advantage provided by the stacked profile is the improved dissipation of heat generated by the sub-circuits. With the stack of packages, increased thermal dissipation from the upper packages is possible because these packages are better subjected to direct airflow. Dissipation is further improved by the use of novel heat sinks in combination with the stacked configuration of the present invention.

The invention will be better understood upon reference to the following detailed description in connection with the accompanying drawings.

DETAILED DESCRIPTION

Figure 1:
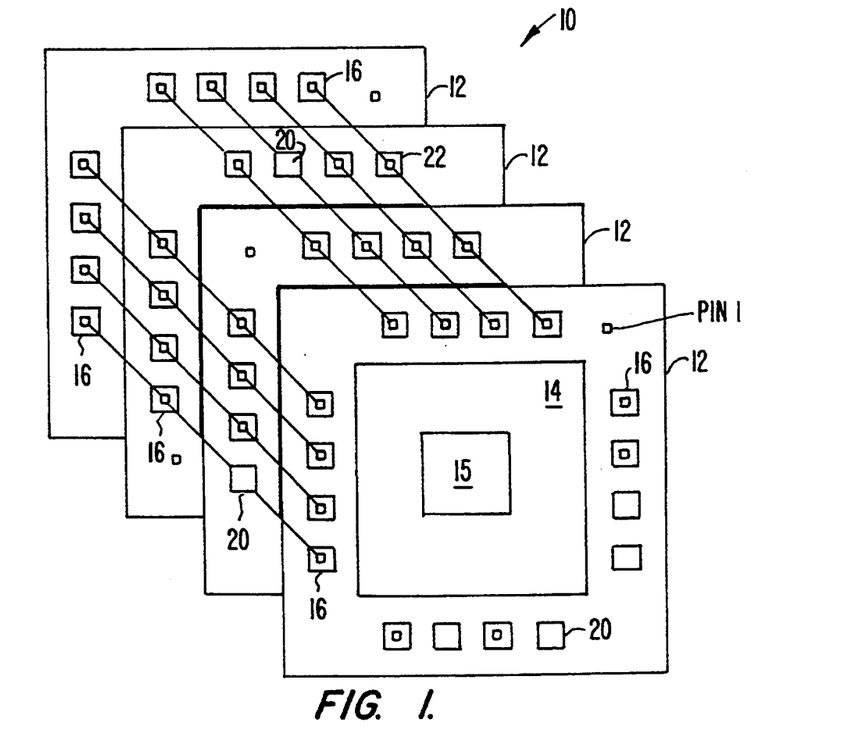
FIG. 1 is a diagrammatic top perspective view of a stack of four electrically coupled pin grid array (PGA) packages.

Referring now to the drawings, wherein like reference numerals designate identical or corresponding parts throughout the several views, the packaging technique of the present invention is shown in FIG. 1 where several electronic packages 12, each housing a sub-circuit on a integrated circuit die or chip 15, are interconnected to form a vertical stack 10. FIG. 1 is a diagrammatic top perspective view of four packages 12 of a type commonly referred to as a pin grid array (PGA). In one particularly preferred embodiment, the PGA packages are low cost fiberglass packages with copper wires and punch-through pins, however, the packages may be made of ceramic or plastic. Each package, in the preferred embodiment, has more signal pins than the chip has input or output pads.

Each package 12 has a central chip site 14 to which chip 15 is attached. Typically, chip site 14 is coated with a metallic alloy and chip 15 is attached with silver-filled epoxy although other attachment methods are known and may be used in the present invention. Bond wires 17 connect selected bond pads 18 on each chip 15 to a corresponding package bond pad where each package bond pad corresponds to a pin 16 of package 12. The dark square interior of pin 16 indicates its electrical connection to a bonding pad on chip 15. As the number of signal pins are increased, it is common for packages 12 to have multiple tiers of bond pads. By keeping the cavity dimensions of chip site 14 relative to the chip 15 dimension, it is possible to prevent the bond wires from drooping.

It is important that pins 20 and 22 also be provided on each package 12. Pins 20 are provided with a package bond pad but are not bonded to a corresponding pad on chip 15. Accordingly, these pins provide an electrical path for coupling corresponding pins 16 on one package with corresponding pins 16 on another non-adjacent package. Since pins 20 are not bonded to a chip pad, pins 20 do not exhibit the dark square interior. Pins 22, although bonded to a corresponding pad on chip 15, hence the dark square interior, are electrically isolated from corresponding pins 16 on a lower adjacent package.

Figure 2:
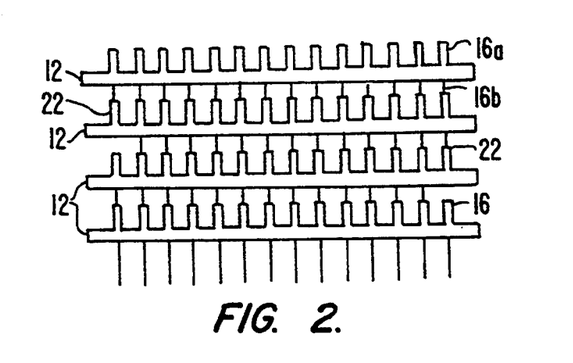
FIG. 2 is a side view of the stack of packages shown in FIG. 1.

The various means of interconnecting packages 12 in stack 10 may be better understood with reference to FIG. 2. Here a side view of stack 10 comprising the four packages 12 is shown. Each pin 16 has an upper receptacle 16a and a lower shaft 16b. In contrast and by way of example, pin 22 on the second package 12 in the stack only has an upper receptacle portion 22, the lower shaft portion having been removed. Pin 22 is thus electrically isolated from pin 16 of the lower most package 12 in stack 10. Another pin 22 is shown isolating the top two packages 12 from the bottom two packages 12.

Figure 3:
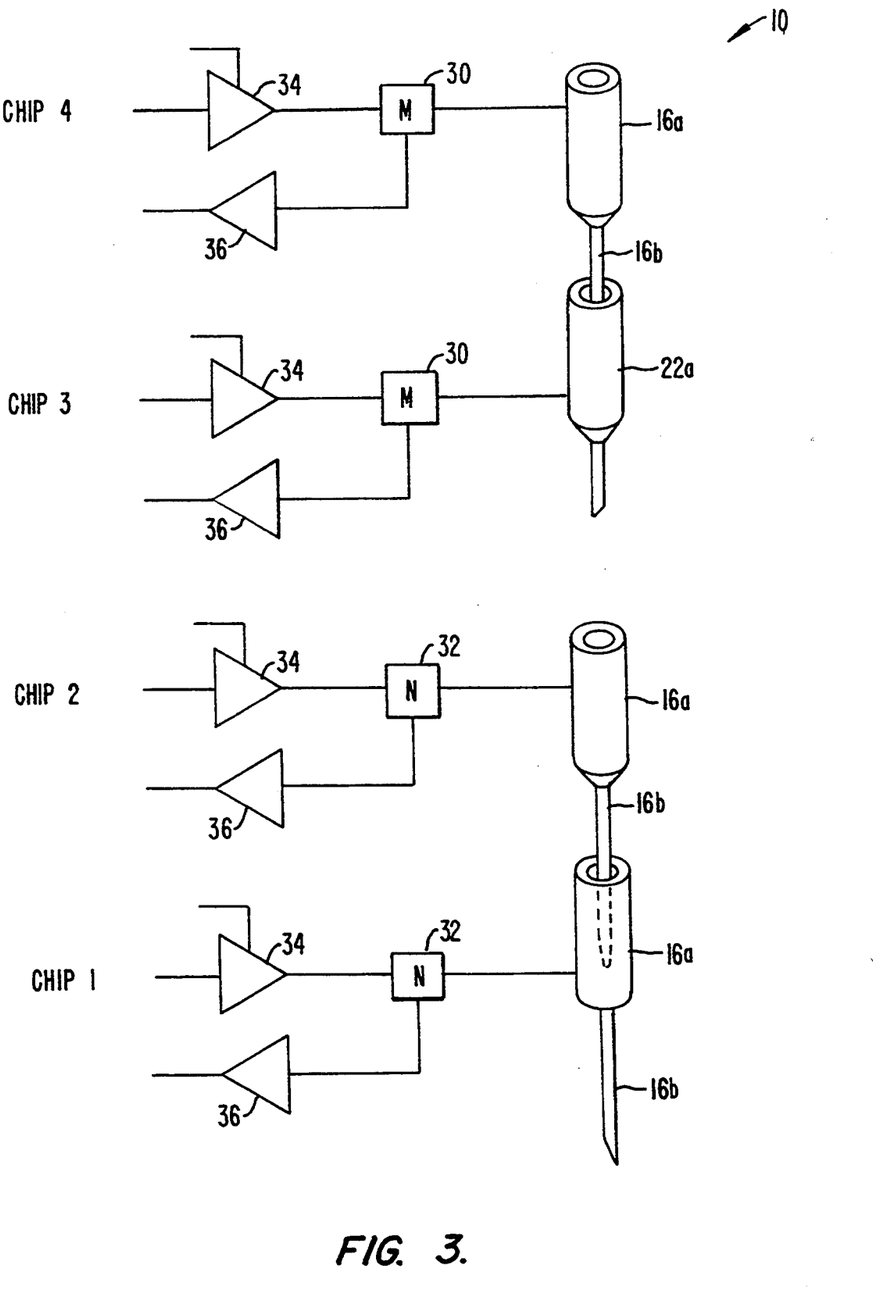
FIG. 3 is a partial schematic representation of four chips packaged in individual packages coupled in the stacked manner of FIG. 1.

Referring now to FIG. 3, a partial schematic representation of four chips arranged in the vertical stack 10 is shown. In one particular embodiment of the present invention, each chip has a signal pad 30 or 32 coupled to a corresponding pins 16 or 22 and to a three-state output buffer 34 and an input buffer 36.

In accordance with one significant feature of the present invention, the shaft of pin 22 has been removed. In this manner, pad 30 of chip 4 which is coupled to pin 16 is also coupled to pad 30 of chip 3 but is isolated from pads 32 of chips 1 and 2.

In one especially preferred embodiment of the present invention, field programmable gate arrays (FPGAs) are used to configure the electronic circuit on more than one chip. FPGAs provide design flexibility not available from other semiconductor technology such as custom integrated circuits or application specific integrated circuits (ASICs). To provide maximum flexibility without increasing costs, FPGAs are electrically attached or bonded to package pins 16 according to one of a limited number of bonding patterns. However, with a limited number of bonding patterns, there is a loss of flexibility in combining the packages in the stack. Accordingly, to increase flexibility in interconnecting the packages, additional pins 20 and 22 are provided on each package in a manner that permits each package to be rotated relative to adjacent packages. Thus, pins 20 and 22 may be used to generate interpackage connections that are dependant on the requirements of the specific electronic circuit that is implemented on the FPGA after the bonding pattern has been chosen.

Figure 4A:
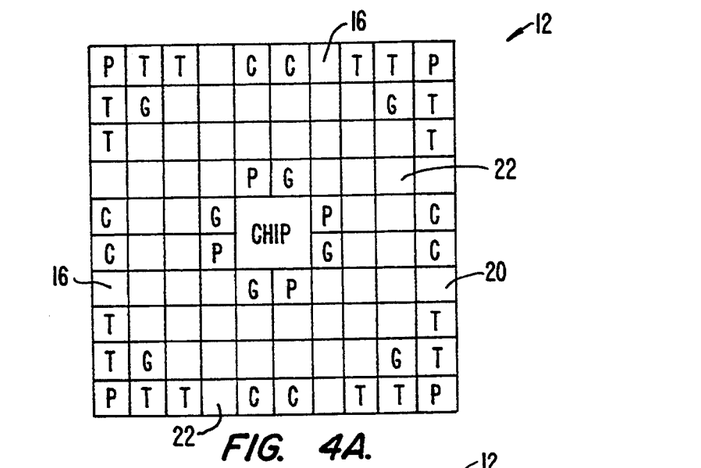
FIGS. 4A–4C are diagrammatic illustrations of the bottom view of a PGA package.
Figure 4B:
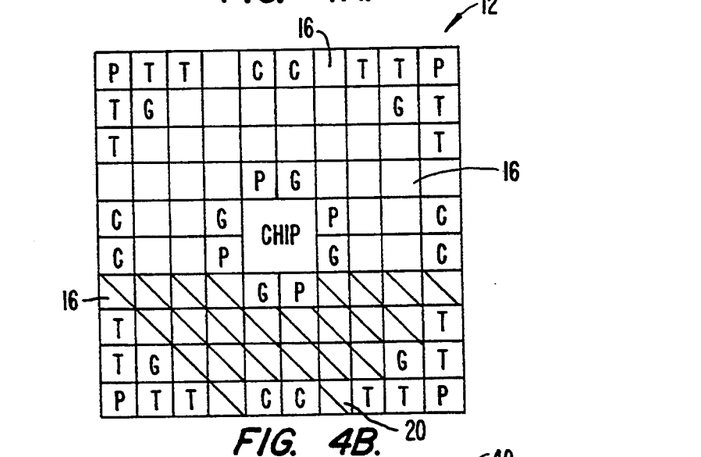

In FIGS. 4A–4B, a diagrammatic illustration of the bottom view of a PGA package is shown where each square represents a single pin 16. In typical applications, selected pins 16 on each package 12 are reserved for power and ground connections, designated P and G, respectively and additional pins 16 are reserved for test functions and clock signals, designated T and C, respectively. Furthermore, it is to be understood that it is possible for some squares to represent a pin 22 having its lower shaft portion removed or a pin 20 which is not bonded to a pad on the chip. Preferably, the remaining squares represent pins 16 that are bonded to a corresponding pad on the chip.

By way of example, one possible bonding pattern is shown in FIG. 4B where unbonded pins 20 of a single package 12 are designated by cross-hatching. A composite view of two packages having the bonding pattern shown in FIG. 4B are shown in a stack 40 in FIG. 4C. In stack 40, the first or lower package has the same orientation as that shown in FIG. 4B. Although the second or upper package has the same bonding pattern, it has been rotated 90 degrees clockwise relative to the first package. It is to be understood that the bonding pattern in FIG. 4B is shown of illustrative purposes and a wide variety of bonding patterns may be easily envisioned each of which are within the scope of the present invention.

Figure 4C:
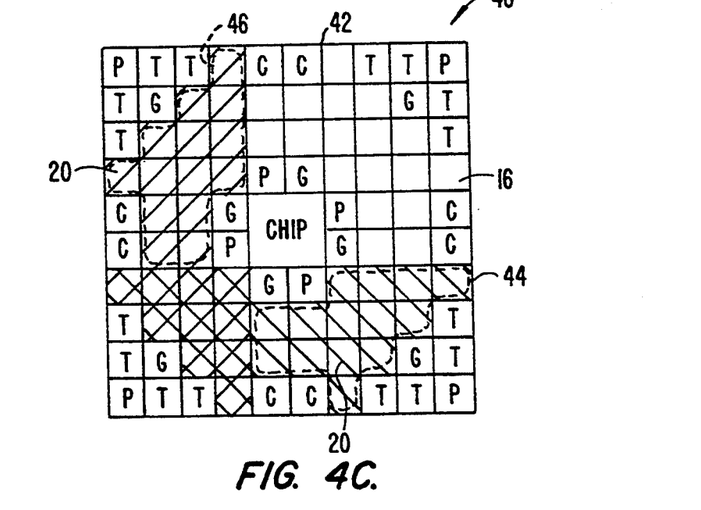

In stack 40 of FIG. 4C, pins 16 in the region denoted by dashed line 42 will be coupled in the same manner that pads 32 of chips 1 and 2 are coupled in FIG. 3. Pins 16 in region 44 on the top package will be coupled to pins 20 that are not bonded to the chip carried by the bottom package. Thus, pins in region 44 on the top package are directly coupled to the signal leads of the printed circuit board to which the pins 20 of the bottom package are attached. Pins 16 of the bottom package in region 46 will not be coupled to the chip in the top package because corresponding pins 20 on the top package are not bonded to its chip. Although some of the pins of each package 12 are not connected, the number of unconnected pins are minimized by the ability to rotate packages on stack 40. For example, in the embodiment of FIG. 4C, a PGA package is shown having 126 pins. Using a single bonding pattern, ten pins on both packages are unconnected. These ten pins are each designated as a square having the double crosshatching. However, the number of unconnected pins will decrease as the number of packages in stack 40 are increased and one or more packages are rotated in a manner that utilizes the unconnected pins to route an output from an upper package to a lower package or the printed circuit board.

Accordingly, significant flexibility is provided by pins 20 in combination with rotating one or more packages in the stack. However, there is no requirement that the packages in stack 40 be rotated. Nor is there a requirement that a package be rotated 90° with respect to the lower adjacent package in stack 40. Accordingly, it should be understood that each package in stack 40 could be rotated by 0°, 180° or 270°.

Further, in the above description of FIGS. 4A–4C, a single bonding diagram is shown, however, added flexibility in interconnecting the packages is obtained by stacking packages having different bonding patterns. These additional bonding patterns further increase the flexibility in interconnecting packages 12.

As noted above with respect to FIGS. 1 and 3, additional flexibility is provided by removing the lower shaft portion of pins 22. Such a feature is especially advantageous for stacks of three or more packages 12 because a package that is provided with a pin 22 may be coupled to pins 16 or 20 of upper packages but isolated from lower packages.

As will be apparent to one skilled in the art, partitioning the electrical circuit among the plurality of packages 12, determining the appropriate rotational pattern and selecting pins that are preferably clipped are tasks suited to be implemented as a computer algorithm.

Although pins 22 provide flexibility, the task of identifying and removing the appropriate pin shaft or shafts to be removed from among the hundreds of pin shafts is difficult. The task of selecting and removing the proper pin shaft is especially difficult as the number of pins on package 12 is increased. Accordingly, the present invention also provide a template which may be used to identify the selected pins from which the pin shaft is to be removed.

Figure 5:
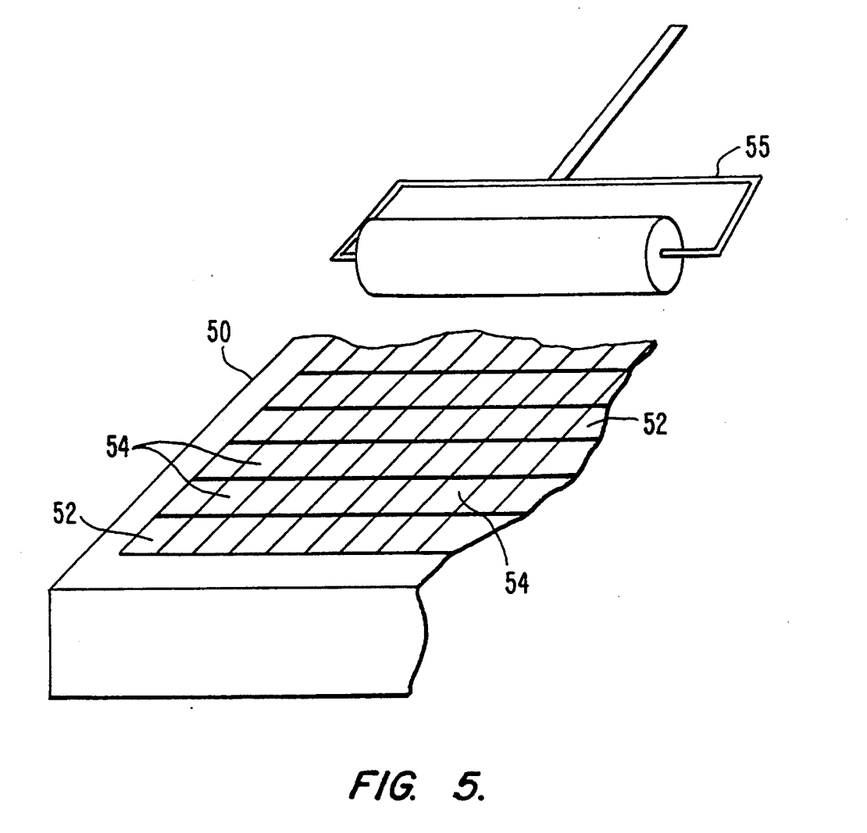
FIG. 5 is an illustration of a template that may be associated with the packages of FIG. 1 to aid in identifying package pins.
Figure 6:
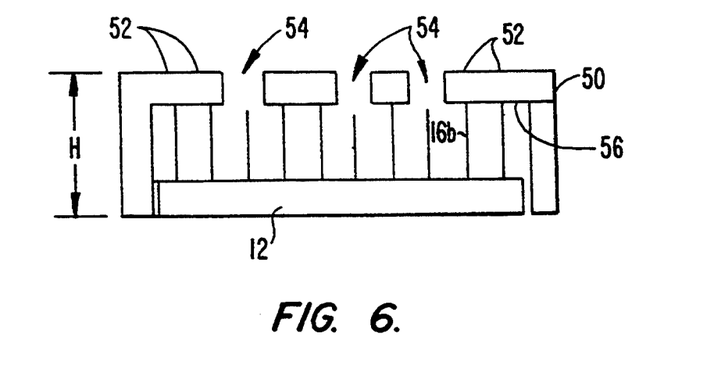
FIG. 6 is an illustration of the template of FIG. 5 positioned over an inverted PGA package.

One embodiment of the template is shown in FIG. 5. In this preferred embodiment, a plastic shell-like enclosure 50 is provide having a plurality of easily removable windows 52 arranged along an upper surface. Selective windows 52 may be removed from enclosure 50 to expose the shaft of a pin below. For example, as shown in FIG. 6 where a single package 12 is disposed with the shafts of pins 16 pointing upward, enclosure 50 is sized such that it may be placed above the inverted PGA package 12. With selected windows removed, as indicated at 54, the shaft of corresponding pins 16 are exposed while the shafts of adjacent shaft pins 16 remain covered by windows 52. The exposed shaft portion of pins 16 may then be marked in the manner described below for easy identification once enclosure 50 is removed.

It is preferable, that the dimensions between the inner surface of the top plate of enclosure 50 closely correspond to the maximum height of the shafts of pins 16. Accordingly, the dimension of outer side wall of enclosure 50, denoted as H in FIG. 6, must be sufficient to space inner surface 56 closely proximate to the end of the shafts. In one preferred embodiment, enclosure 50 is an injected molded housing having a substantially uniform thickness of approximately 0.062 inches. Windows 52, however, are preferably attached to enclosure 50 in a manner that allows easy removal with any elongated object such as a punch. In one preferred embodiment, windows 52 have a thickness of about 0.03 inches with a partial perforation around the edge of each window 52.

Included with the embodiment shown in FIG. 5, is a soft foam ink roller 55 which may be used to mark exposed pins 16 using a water soluble ink. In this embodiment, ink roller 55 is coated with ink rolled across the top of the enclosure 50. Wherever a window 52 has been removed, such as at 54, ink readily passes through enclosure 50 onto the exposed shaft of pin 16.

In another embodiment, a pad (not shown) having dimensions approximately equal to the top surface of enclosure 50 may be inked and pressed to the top of enclosure 50 allowing ink to pass from pad through open windows 54 onto exposed pin shaft 16b.

One advantage of using a water soluble ink to mark exposed pins is that such a solution prevents the build up of static electricity that may be generated by the action of the soft foam ink roller on enclosure 50. Another advantage is that the water soluble ink also eliminates the necessity to use chloroflourocarbon (CFC) solvent as a cleaning solution in cleaning enclosure 50 after use. Thus, after marking the pin shafts to be removed, enclosure 50 may be easily removed from the package and cleaned with water. It may also be reused in marking additional packages.

Once selected shafts of pins 16 are marked, enclosure 50 is removed from the package and these shafts are removed thereby providing pins 22 which comprise the receptacle portion of the pin.

Stacks 10 and 40 may house an electronic circuit that generates a significant amount of heat which must be dissipated to prevent damage to the chips. In one especially preferred embodiment, a heat pipe is attached to stacks 10 and 40. In other embodiments, heat sinks are attached to packages 12 to dissipate the heat generated by the chips. Heat pipes and heat sinks may be used together in a single stack to further increase thermal dissipation.

By way of example, a heat pipe comprising a metal plug is filled with freon or similar gas that encloses stack 10. The heat generated by chips 15 is transferred to the liquid in the heat pipe causing the liquid to evaporate into a gas and rise toward the top of the pipe. Since the top of the heat pipe is cool, e.g., due to air flow, the gas cools, condenses back to a liquid, and cycles back to the bottom of the pipe.

In addition to the heat pipe, stack 10 may also include a heat sink, such as a copper plate, attached to packages 12 in proximity to the central chip sites 14. The heat sinks provide a means for transmitting heat from the center of the package to the heat pipe. One skilled in the art will understand that the heat sinks may be used without the heat pipe if the heat sinks alone will provide sufficient thermal dissipation.

In one preferred embodiment, the heat sinks comprise a copper disk having a solid center region and an outer region having a plurality of openings. Each opening corresponds to a package pin 16 or a group of package pins so that the heat sink will slide over pins 16 and contact package 12 immediately under the central chip site. Heat will then be conducted by the heat sink from the central area outward thereby cooling the chip 15.

Referring again to FIGS. 3 and 4A, an additional feature of the present invention is disclosed with respect to pins labeled T in FIG. 4A. The T pins may be used to implement various test functions including verification of the interconnection of the packages of stack 59. The T pins are replicated in each corner of package 12 and are defined as a test data input pin, TDI, a test data output pin, TDO, a test clock pin, TCLK and a mode select pin, TMODE. With these four pins, standard JTAG programming test functions may be routed to the various chips.

Figure 7:
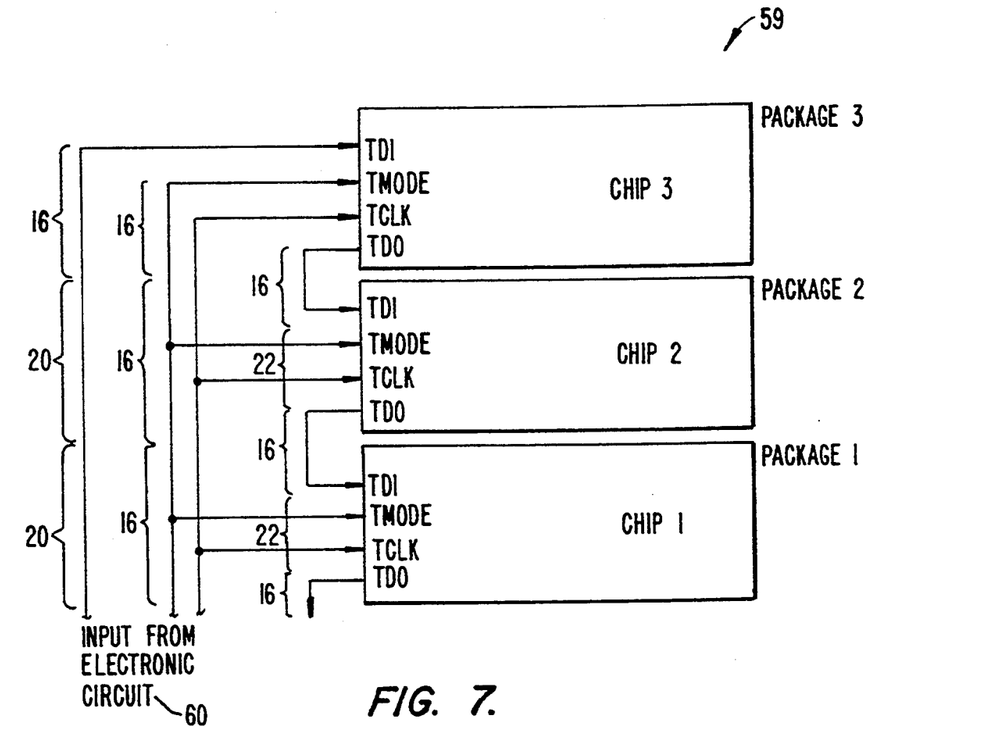
FIG. 7 is a diagrammatic illustration for interconnecting selected pins in a three chips stack according to the present invention.

Because packages in stack 59 are rotatable with respect to adjacent packages, special care must be taken in ensuring that the location of the T pins are proper for interconnection between packages. One preferred embodiment of the arrangement of test pins for a three chips stack is shown in FIG. 7. Input signals from the electronic circuit, represented at 60, are diagrammatically routed to the TDI, TMODE, TCLK inputs and routed from the TDO output. Interconnection from circuit 60 to the inputs of package 3 are provided through package pins 16 and 20. Specifically, test data input to the TDI pin is routed from circuit 60 through a pin 20 of package 1. As noted above with respect to FIG. 1, pin 20 is not electrically connected to chip 1. In this manner, a signal may be passed from circuit 60 to a pin 20 of package 2. Since pin 20 of package 2 is electrically connected to pin 16 of package 3, the input signal from circuit 60 is thus coupled from circuit 60 directly to the TDI input of package 3.

Input from circuit 60 to the TMODE and TCLK are coupled in parallel. Specifically, since TMODE and TCLK are common to each of the three packages, one pin 16 of package 1 is bonded to the TMODE input of chip 1. Similarly, one package pin 16 of package 2 is coupled to the corresponding pin 16 of package 1 and is bonded to the TMODE input of chip 2. Finally, one pin 16 of package 3 is coupled to the corresponding pin 16 of package 2. With the above described pin coupling, the input signal from circuit 60 is provided in parallel to each TMODE input of the three packages in stack 59. The TCLK input of each package is similarly coupled using pins 16. The test data output TDO of packages 3 and 2 are coupled to the corresponding TDI input of packages 2 and 3, respectively, by pins 16.

Figure 8:
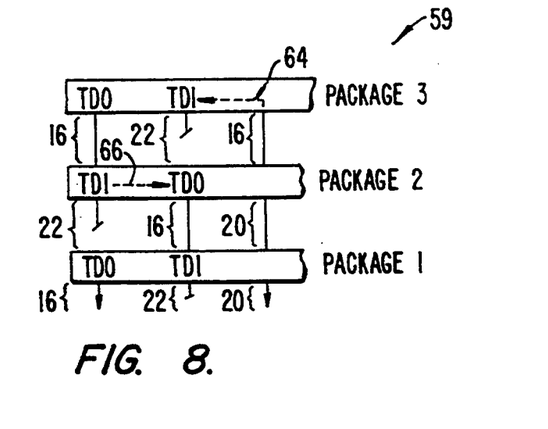
FIG. 8 is a partial side view of the packages of FIG. 7 illustrating one manner of interconnecting the selected pins in the package stack of FIG. 7.

Interpackage connection of TDI and TDO may be best understood by reference to FIG. 8 which shows a side view of package stack 59. Specifically, two pins 20 of package 1 and 2 electrically couple circuit 60 to package 3. An internal jumper 64 electrically couples pin 16 to the TDI input. The pin normally associated with the TDI input of package 3 is removed as indicated by pin 22 which has had its shaft removed in the manner described above. Accordingly, the TDI input is electrically isolated from the package below. As data is provided by circuit 60 to the TDI, TCLK and TMODE inputs, various test structures provided on chip 3 generate an output at the TDO output. This output is coupled from package 3 to the TDI input of package 2 by pin 16.

Since the pin 22 that would normally couple the TDI input of package 2 to package 1 has been removed, the TDI input of package 2 is electrically isolated from the TDO output of package 1. Internal to package 2, the TDI input is electrically coupled to the TDO output by circuitry indicated by line 66. The TDO output of package 2 is coupled by another pin 16 of package 2 to the TDI input of package 1. To isolate the TDI input of package 1 from circuit 60, pin 22 associated with TDI has its shaft removed. The TDO output of package 1 is coupled to circuit 60 by pin 16 of package 1. In this manner, a test signal input can be routed to package 3, filtered through the various chips to verify correct implementation of stack 59 with the output read from pin 16 of package 1.

It should be understood by one skilled in the art that the present packaging scheme is representative only and is not dependent on a specific number of pins or bonding diagram. Such packaging scheme may clearly be extended to packages having a greater number of pins and different bonding patterns. Although the present invention has been described in connection with a preferred embodiment thereof, many variations and modifications will now become apparent to those skilled in the art. It is preferred, therefore that the present invention be limited not by the specific disclosure herein, but only the appended claims.

We claim:

1. In an electronic system including at least one integrated electronic circuit partitionable into a plurality of sub-circuits, a packaging system comprising:
   means for partitioning said integrated electronic circuit into at least two sub-circuits each having a plurality of signal bonding pads and a plurality of power bonding pads;
   a plurality of electronic packaging means for mounting said sub-circuits so that each of said sub-circuits is mounted into a corresponding one of said packaging means, each of said packaging means having a plurality of input and output pins, each of said packaging means being axially aligned with respect to each other, each pin having two complementary ends, each end of said pins capable of mating with another complementary end of another pin of another axially aligned packaging means forming conductive paths between said sub-circuits, at least one conductive path being broken between a predetermined pair of sub-circuits, thereby isolating the predetermined pair of sub-circuits from each other on said broken path;

a first interconnection means for coupling said signal and power bonding pads to said pins in each packaging means;

whereby said plurality of packages are interconnected such that said sub-circuits form said electronic circuit.

2. The packaging system of claim 1 wherein said electronic packaging means comprises a pin grid array package having a plurality of input and output signal pins, a plurality of clock pins and a plurality of power pins.

3. The packaging system of claim 2 wherein said power and clock pins are disposed in a symmetric pattern so that said packages are rotatable with respect to each other.

4. The packaging system of claim 3 wherein electronic packaging means further comprises test pins are disposed in a symmetrical pattern with said power and clock pins.

5. The packaging system of claim 4 wherein said test pins include a first pin for carrying test data in, a second pin for carrying test data out and a third pin for setting a test mode.

6. The packaging system of claim 4 wherein at least one of said packaging pins is not connected to a bonding pad of said corresponding sub-circuit to provide an electrical path from one packaging pin of one package to another packaging pin of another, non-adjacent, package.

7. The packaging system of claim 1 wherein said electronic packaging means comprises a body portion for housing said sub-circuit, and said pins, each of said pins having a substantially cylindrical shape with a lower extension and an upper receiving end, said receiving end of each pin sized complementary to the lower extension of said pins such that insertion of the lower extension of one pin in the receiving end of another pin electrically couples said pins.

8. The packaging system of claim 7 wherein at least some of said pins are removed to prevent insertion of one package pin into another package pin, to break a conductive path between packages.

9. The packaging system of claim 8 wherein said lower extension of a pin is removed to prevent insertion into another pin.

10. The packaging system of claim 1 wherein a predetermined set of said pins in said packaging means are prevented from interconnecting with a pin in another packaging means, whereby conductive paths are broken between said pair of packaging means.

11. A method for partitioning an electronic circuit among a plurality of multi-pin packages comprising:

determining the number of sub-circuits into which said electrical circuit is to be partitioned;

applying a partitioning transformation to said electronic circuit so as to partition said electronic circuit into at least two sub-circuits, each having a specified number of logic gates, signal inputs and signal outputs;

attaching each of said sub-circuits to a corresponding one of said packages such that each signal input and signal output of said sub-circuit is electrically connected to a corresponding one of said package pins;

interconnecting package pins of one of said packages with package pins of another package such that the interconnected package pins electrically connect selected signal inputs and signal outputs of one package with selected signal inputs or signal outputs of another of said packages by:

connecting a package pin of a package with a package pin of another axially aligned package, thereby forming a conducting path between said packages;

connecting a preselected set of pins which is less than the total number of pins of a package with said corresponding sub-circuit, whereby nonselected pins of said package may be used as a conducting path to another axially aligned package without connection to said sub-circuit; or breaking a connection between a pin of one package with a pin of another axially aligned package, thereby isolating said sub-circuits of said axially aligned packages from each other on said broken connection.

12. The method of claim 11 wherein said sub-circuits comprise field programmable gate arrays bonded according to one of a plurality of standard bonding patterns.

13. The method of claim 11 wherein each of said packages are rotatable relative to adjacent packages.

14. The method of claim 13 wherein said partitioning transformation applying step further comprises the step of:

generating a test pattern that verifies the operation of said electronic circuit when said sub-circuits are interconnected in a stacked vertical manner.

15. The method of claim 13 wherein said partitioning transformation applying step further comprises the steps of:

generating a pin map for each of said plurality of packages designating selected ones of said plurality of pins to be removed; and generating a stack map for specifying the order in which said plurality of packages are to be stacked and the rotational orientation of said packages.

16. The method of claim 15 wherein said pin map generating step includes creating an enclosure for each of said packages having selected ones of pins to be removed, said enclosure having openings corresponding to said selected pins;

placing said enclosure over said package so that said selected pins are exposed by said corresponding openings; and marking said selected pins by said exposure.

17. The method of claim 11 further comprising interconnect means for coupling selected ones of said signal inputs and signal outputs of said stack of vertically interconnected packages to an electronic system.

18. The method of claim 17 wherein said interconnect means comprises an electrical socket adapted for coupling the signal inputs and signal outputs of one of said packages to said electronic system.

19. A method for vertically interconnecting an electronic circuit, partitionable into a plurality of individually packaged sub-circuits, to an electronic system; said method comprising the steps of:

1) providing a location in said electronic system adapted to receive the signal pins of one of said packaged sub-circuits;
2) designating and removing from each of said packages selected ones of the plurality of package pins;
3) generating a partitioning program diagram and vertically stacking said packages according to said partitioning program diagram;
4) adding a heat pipe to the top of said package stack; and
5) inserting said package stack into said location.

20. The method of claim 19 wherein said packaged sub-circuits are inserted into said location individually.

21. In an electronic system having a circuit board for mounting electronic packages, said system including at least one integrated electronic circuit partitionable into a plurality of sub-circuits, a packaging system comprising:
means for partitioning said integrated electronic circuit into at least two sub-circuits, each having a plurality of signal and power bonding pads, said signal bonding pads including clock signal bonding pads;
a plurality of electronic packages for mounting said sub-circuits so that each of said sub-circuits is mounted into a corresponding one of said packages, each of said packages having a plurality of input and output pins, a first interconnection means for coupling said signal and power bonding pads to said pins in each package, each pin of one package interconnectable with a pin of another package forming conductive paths between said sub-circuits, said packages in vertical relationship with each other; and
pins coupled to said power and clock signal bonding pads disposed in a symmetric pattern in each package so that said packages are rotatably interconnectable to each other such that said sub-circuits form said electronic circuit.

22. The packaging system of claim 21 wherein a pin in said package is prevented from interconnecting with a pin in said another package, whereby a conductive path is broken between said pair of packages.

23. The packaging system of claim 22 wherein at least part of said package pin is selectively removed to prevent insertion of said package pin into said another package pin.

24. The packaging system of claim 23 wherein each of said package pins has a substantially cylindrical shape with a lower extension and an upper receiving end, said receiving end of each package pin sized complementary to the lower extension of said package pins such that insertion of the lower extension of one package pin in the receiving end of another package pin electrically couples said package pins, said lower extension of a pin being removed to prevent insertion into another pin.

25. The packaging system of claim 24 wherein at least one of said packaging pins is not connected to a bonding pad of said corresponding sub-circuit to provide an electrical path from one packaging pin of one package to another packaging pin of another, nonadjacent, package.

26. The packaging system of claim 21 wherein package pins further comprise test pins are disposed in a symmetrical pattern with said power and clock pins.

27. The packaging system of claim 26 wherein said test pins include a first pin for carrying test data in, a second pin for carrying test data out and a third pin for setting a test mode.

28. A method for partitioning an electronic circuit among a plurality of multi-pin packages comprising:
determining the number of sub-circuits into which said electrical circuit is to be partitioned;
applying a partitioning transformation to said electronic circuit so as to partition said electronic circuit into a plurality of sub-circuits, each having a specified number of logic gates, signal inputs and signal outputs;
attaching each of said sub-circuits to a corresponding one of said packages such that each signal input and signal output of said sub-circuit is electrically connected to a corresponding one of said package pins in a pattern such that said packages are rotatable with respect to each other;
interconnecting each package pin of one of said packages with another package pin of another package such that the interconnected package pins electrically connect selected signal inputs and signal outputs of one package with selected signal inputs or signal outputs of another of said packages by:
rotating one package with respect to another package and
connecting a package pin of a package with a package pin of another axially aligned package, thereby forming a conducting path between said packages.

29. The method of claim 28 wherein said partitioning transformation applying step further comprises the steps of:
generating a pin map for each of said plurality of packages designating selected ones of said plurality of pins to be removed; and
generating a stack map for specifying the order in which said plurality of packages are to be stacked and the rotational orientation of said packages.

30. The packaging system of claim 29 wherein said sub-circuit attaching step further comprises disposing package pins for testing are in a symmetrical pattern.

31. The packaging system of claim 30 wherein said testing pins include first pins for carrying test data in, second pins for carrying test data out, and third pins for setting test modes.

32. The packaging system of claim 30 wherein said sub-circuit attaching step further comprises disposing package pins for power and clock signals in a symmetrical pattern.

* * * * *